(No Model.)

C. J. RICHARDSON.
REGISTER FOR PAPER MAKING MACHINES.

No. 456,061. Patented July 14, 1891.

Witnesses
D. H. Naylor
G. M. Copenhaver

Inventor
C. J. Richardson
by Connolly Bros.
atty

UNITED STATES PATENT OFFICE.

CHARLES J. RICHARDSON, OF GATESHEAD-ON-TYNE, ENGLAND.

REGISTER FOR PAPER-MAKING MACHINES.

SPECIFICATION forming part of Letters Patent No. 456,061, dated July 14, 1891.

Application filed January 22, 1891. Serial No. 378,709. (No model.) Patented in England May 15, 1890, No. 7,598.

*To all whom it may concern:*

Be it known that I, CHARLES J. RICHARDSON, a subject of the Queen of Great Britain, residing at Gateshead-on-Tyne, in the county of Durham, England, have invented certain new and useful Improvements in Indicators for Paper-Making Machines, (for which I have obtained Letters Patent of Great Britain, dated May 15, 1890, No. 7,598;) and I do hereby declare the following to be a full, clear, and exact description of the invention, reference being had to the accompanying drawings, which form part of this specification.

My invention has relation to indicators for paper-making machines, and has for its object the provision of a novel apparatus by means of which the length, breadth, and quantity of paper made upon the machine to which this apparatus is applied may be ascertained at any moment and in few seconds of time and without resort to the laborious and intricate calculations heretofore found necessary for the accomplishment of the same result.

In carrying my invention into effect I fix upon any appropriate and convenient place on the paper-making machine a small case or box containing two revolving drums, which receive motion from the shaft of one of the rolls of the machine through intermediate gearing so arranged and proportioned that one of the drums will travel at a rate which will cause it to make ten revolutions to one revolution of the other, and so that one revolution of the slower-moving drum will result from a certain length of paper made, (say one hundred feet,) and one revolution of the faster-moving drum will result from one-tenth that amount being made. Suitable scales at the edge of the peripheries indicate decimals of the length of output, and upon each drum are fixed tables of constants, and a fixed scale having a sliding pointer is provided, by means of which the output of the machine is indicated and determined at a glance.

My invention consists in the novel construction, combinations, and arrangements of parts hereinafter described and specifically claimed.

Figure 1:
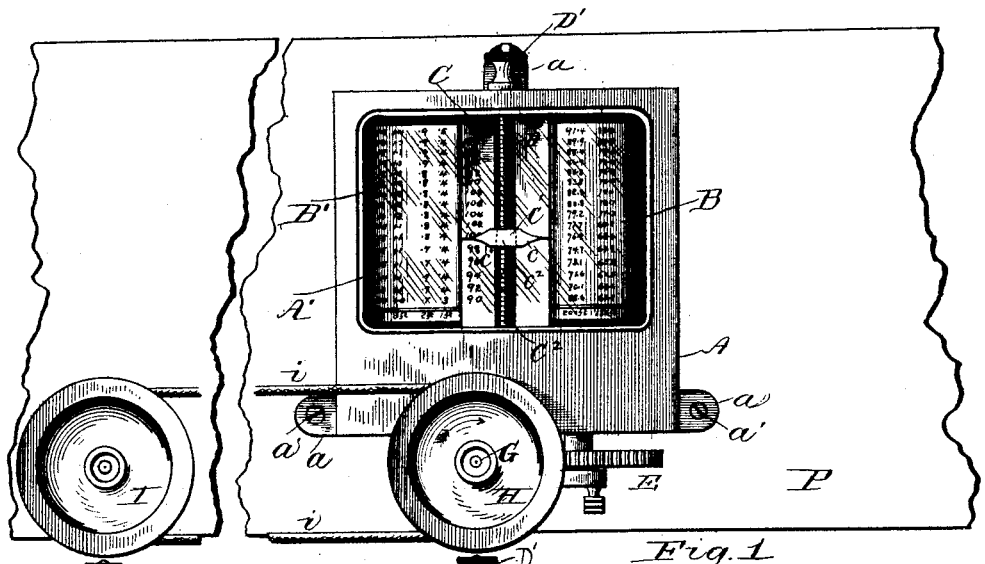
Figure 2:
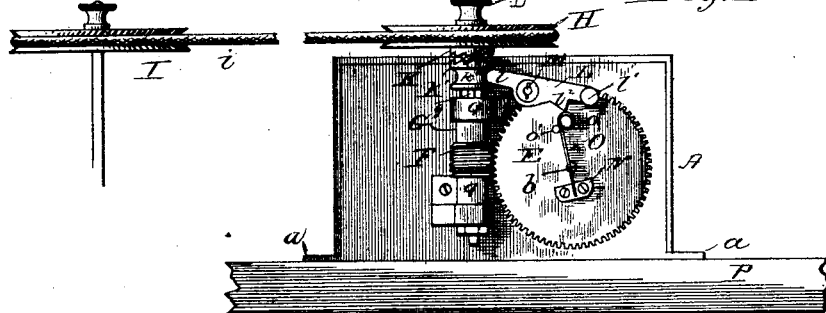
Figure 3:
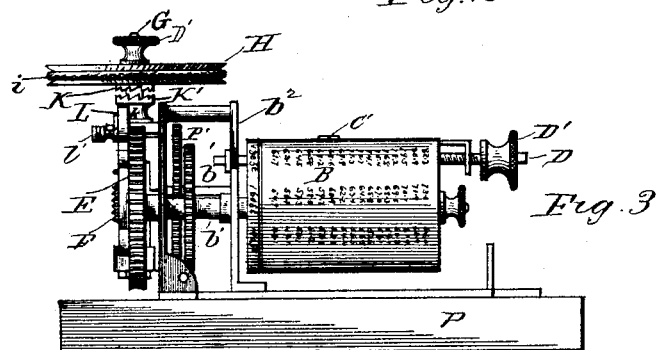
Figure 4:
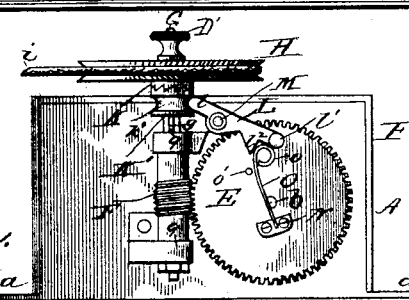

Referring to the accompanying drawings, Figure 1 is a front view; Fig. 2, an end view; Fig. 3, a side elevation with the casing removed, and Fig. 4 a detail view.

A designates a suitable metallic casing having feet $a\ a\ a$, through which pass screws $a'\ a'\ a'$, fastening it to a part P of the paper-making machine, and having an opening $A'$ in front, which may be covered with a plate of glass.

Within the casing A and journaled on shafts $b\ b'$, which pass through a horizontal bracket $b^2$, are two drums B and B', which have near their lower ends scales with numbers, the scale on drum B indicating two hundred feet in divisions of twenty feet, while the scale on drum B' indicates twenty feet in divisions of one foot.

On each of the drums B and B' are fixed ten tables of constants in columns, and in front of the drums is fixed a scale-plate C, partly overlapping each and provided with a sliding pointer C', with two points $c\ c'$, extending to the edges of the scale-plate. A nut $c^2$ on the back of the pointer passes through a slot $C^2$ in the scale-plate, and a vertical screw D passes through said nut and is journaled at one end in the bracket $b^2$, the other end passing through the end of the casing and being provided with a thumb-nut $D'$, by means of which the screw may be turned and the pointer moved to any desired point of the scale-plate.

Upon the scale-plate C is a scale with numbers, which in the present instance are from 90 to 120 in even numbers, but may be any desired series of numbers, and which indicate the widths in inches of the paper which may be run upon the machine. The shaft $b$ of the drum B passes through the bracket $b^2$ and the bottom of the casing and has fixed upon its end outside of the casing a worm-wheel E, that meshes with a worm F, fixed on a shaft G, having bearings in brackets 9 9, attached to the bottom of the casing. The shaft G has loosely mounted on its end a pulley H, that receives motion from a pulley I through a belt $i$ on the shaft of one of the rolls of the paper-making machine, the proportion between the sizes of the pulleys H I being such that the exact length of the paper passing over the roll to the shaft of which the pulley I is attached will be indicated by a corresponding proportional movement of the drums B B'.

Motion is communicated from the pulley H to the shaft G by means of a toothed clutch, one member K of which is attached to the pulley, while the other member K' slides on the shaft and turns the same (when the two members are engaged) through the medium of a feather or spline $g$ on the shaft. The engagement of the clutch members K K' is effected by means of a lever L, which is fulcrumed on a pin M, projecting from the bottom of casing A. This lever has a rounded end $l$, that fits into a groove $k'$ in the clutch member K', and the opposite end of the lever extends over in front of the worm-wheel E and is provided with a handle $l'$, by means of which the lever is pressed toward the center of the worm-wheel when it is desired to throw the clutch members into engagement.

Upon the side of the lever L nearest the center of the worm-wheel is formed a tooth $l^2$, beveled on one side and straight on the other, and upon the face of the worm-wheel is fixed a block N, that carries a spring-arm O, the free end of which is bent into a circle $o$, and the function of said spring is to raise the lever L as the worm-wheel completes a revolution and thus disengage the clutch members K K', the circular end of the spring coming into contact with the beveled side of the tooth $l^2$ as the worm-wheel revolves, thus pushing the lever out from the center of the worm-wheel, a pin $o'$ being set in the face of the worm-wheel to prevent the spring from being bent backward by the pressure against the lever. When the worm-wheel has completed a revolution, the point of the tooth $l^2$ rests just upon the apex of the circular portion $o$ of the spring O, in which position of the lever the clutch members are out of engagement. To throw them into engagement it is only necessary to give the handle $l'$ a sharp push, whereupon the spring, being prevented from bending backward by the pin $o'$, will buckle and bend slightly forward and allow the tooth and the lever to pass behind it. The position of the lever when the clutch members are out of engagement is shown in Fig. 2, and the position when in engagement in Fig. 4. The drums B and B' are so connected that the drum B revolves at a rate ten times as fast as the drum B', and this difference in speed is effected by a train of gearing P', arranged between the bracket $b^2$ and the bottom of casing A.

The operation of the apparatus is as follows: The pulley H being kept constantly in motion turns in the direction of the arrow, and the normal position of parts is that shown in Figs. 1, 2, and 3—that is, the clutch members are out of engagement and the pulley H turns loosely on its shaft. When it is desired to ascertain the output of the machine, the thumb-nut D' is turned to bring the pointer C' to a figure on the scale-plate C, indicating the width of paper being run on the machine. The clutch members are then thrown into engagement and the apparatus "timed" for, say, thirty seconds. At the expiration of this period a glance at the two peripheral scales at the bottom of the drums will enable the operator to judge of the number of feet of paper which have passed through the machine in that time. A second glance at the figures which are opposite and just next the two ends of the pointer C' will show the output in reams. This is accomplished by so calculating and arranging the figures in the tables of constants that when the pointer is set at a figure on the scale-plate indicating the width of paper being run the figures on the drums at the ends of the pointer will give in reams and fractions or decimals of a ream the amount of paper which has been made on the machine during the given period. After taking an observation, as described, the apparatus requires no further attention, as the completion of the revolution of the worm-wheel will bring the parts back to the position shown in Figs. 1, 2, and 3, in which position they will remain ready for the next observation.

Having fully described my invention, I claim—

1. In an indicator for paper-making machines, the combination, with said machine, of two drums receiving motion from a moving part of the same, geared together so as to revolve at different rates, and each provided with a scale, the scale on one drum being in decimal multiple of the scale on the other, substantially as described.

2. In an indicator for paper-making machines, the combination, with a pulley adapted to receive motion from a paper-making machine, a drum having a scale, and intermediate gearing connecting said drum and pulley, of means, substantially as described, for disengaging the pulley and drum.

3. In an indicator for paper-making machines, the combination, with a drum adapted to receive motion from the machine and carrying tables of constants, of a scale-plate arranged in proximity to said drum, and a pointer arranged to move over said scale-plate, substantially as described.

4. In an indicator for paper-making machines, the combination of two drums adapted to receive motion from a shaft of said machine, said drums being so geared that one will travel faster than the other, and both being provided with tables of constants, with a scale-plate having a scale thereon and a movable pointer adapted to be moved along said scale, substantially as described.

5. In an indicator for paper-making machines, the combination of a loose pulley adapted to receive motion from a shaft of the machine and having a clutch member, a sliding clutch member adapted to engage with the clutch-member on the pulley, a shaft on which said sliding member moves, a worm carried on said shaft, a worm-wheel engaging with said worm, and a drum or equivalentnumbered indicating medium connected to said worm-wheel, substantially as described.

6. In an indicator for paper-making machines, the combination of a drum provided with numbers adapted to indicate the output of the machine, a worm-wheel connected to said drum, a worm carried on a shaft and meshing with said worm-wheel, a sliding clutch member keyed on said shaft, a loose pulley carrying a clutch member, a lever adapted to engage said clutch members, and a spring-tongue attached to the face of the worm-wheel and adapted to move said lever and disengage the clutch members when the wheel has completed a revolution, all constructed and arranged substantially as described.

7. The combination, with the pulley H, the shaft G, on which said pulley is mounted, the clutch members K K', the worm-wheel E, the worm F, carried on said shaft and engaging with said worm-wheel, and the drum B, receiving motion from said worm-wheel, of the lever L, connected to the sliding clutch member and having a tooth $l^2$, and the spring-tongue O, having a rounded end $o$, substantially as described.

In testimony that I claim the foregoing I have hereunto set my hand this 24th day of December, 1890.

CHAS. J. RICHARDSON.

Witnesses:
E. H. RICHARDSON,
E. H. WARHAM.